UNITED STATES PATENT OFFICE.

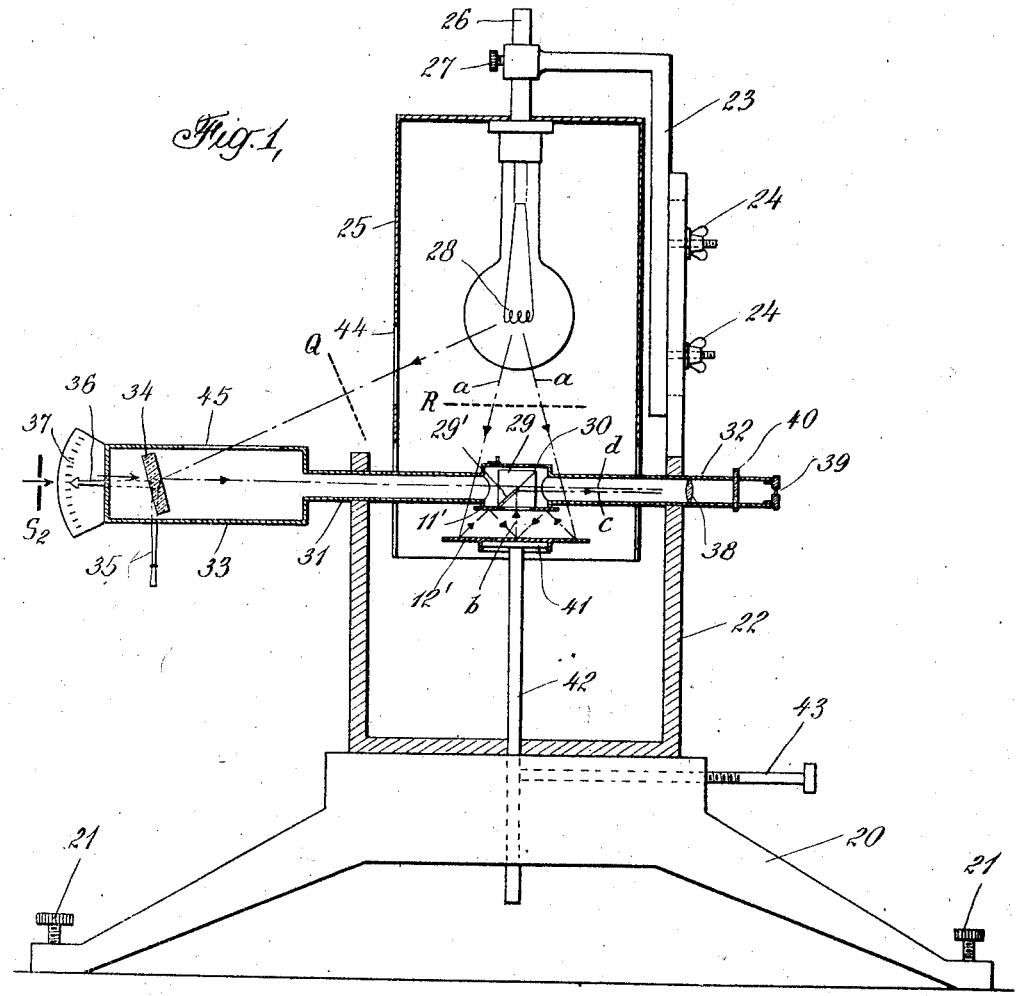
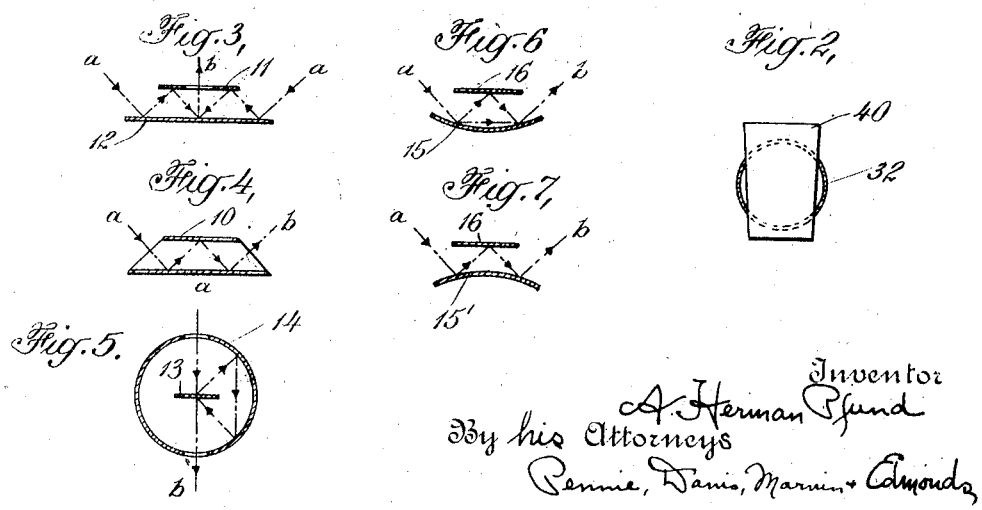

AUGUST HERMAN PFUND, OF BALTIMORE, MARYLAND.

COLORIMETRY OF PAINTS AND PIGMENTS.

1,350,386.

Specification of Letters Patent.

Patented Aug. 24, 1920.

Application filed January 14, 1920. Serial No. 351,423.

*To all whom it may concern:*

Be it known that I, AUGUST HERMAN PFUND, a citizen of the United States, residing at Baltimore, State of Maryland, have invented certain new and useful Improvements in Colorimetry of Paints and Pigments; and I do hereby declare the following to be a full, clear, and exact description of the invention, such as will enable others skilled in the art to which it appertains to make and use the same.

This invention relates to the determination of the color or tint of paints and pigments, and contemplates the provision of an improved method of and apparatus for determining the color or tint of paints and pigments.

If, from an assortment of papers, we should pick out the sheets which appeal to us as being white, we would be satisfied with our choice until we laid the sheets side by side. By comparison some would be yellowish, others bluish, etc., and it would be difficult to select the one sheet that was truly the white. Problems of this character are constantly arising in the paper, paint and textile industries. Up to the present time it has been sought to regulate the uniformity, (with respect to color) of a particular product, by establishig a series of standard samples defining the limits of tolerance. Leaving out of consideration the question of reproduceability, the principal objection to be urged against this mode of procedure is that the standards themselves are subject to change with time. This difficulty has long been recognized and numerous attempts have been made to apply the methods of monochromatic and trichromatic colorimetry. However, these attempts have been unsuccessful, because of the fact that the departure from white is usually so slight that accurate measurements of this departure are practically out of the question.

In the commercial manufacture of zinc oxid, lithopone and other white pigments, it is aimed to produce a pigment that is white. This ideal is not always realized and it frequently happens that these supposed white pigments have a bluish, yellowish or pinkish tint. In order to safeguard the uniformity of product, certain standards of well defined pinkish, yellowish or bluish tint (the so-called "tint limits") are compared with a given sample. If a tint of this sample is fainter than that of the standard tint limits, the product is considered suitable for use, otherwise it is discarded. The comparison is carried out by preparing pastes of the pigments rubbed down in linseed oil. The pastes are spread side by side on a pallet and are then compared. Where the tint differences are large, this method is entirely serviceable, but where the tints of the standard and sample are nearly the same, it is often difficult to tell whether a pigment belongs in the blue, yellow or pink category. Under different conditions of illumination one's judgment of the tint is subject to variations and even under the same conditions of illumination, different observers are often of different opinions.

The method and apparatus of the present invention is peculiarly adapted for determining the variations from white of any particular paint, pigment or the like. White, as a color, is difficult to define, and its definition is more or less arbitrary. Subjectively, white is the color in comparison with which any other color appears tinted. Objectively, the light of the midday sun, (blue sky light excluded) reflected from a non-selective surface, is white. White can be defined in physical units only through its spectral energy curve. In speaking of a surface of yellow or blue, it is tacitly assumed that white light is incident on the surface. If, therefore, a body reflects selectively, it is to be called colored, whereas if it reflects non-selectively, it is to be called white. According to this nomenclature it is entirely proper to speak of one surface as being brighter than another or departing more from white. The term "whiter than" may not be used because the two concepts (1) increase in brightness, and (2) decrease in departure from white (saturation), are both involved.

In accordance with the present invention, the characteristic tint of the particular paint, pigment or the like, is much accentuated for the purposes of comparing this tint with a predetermined standard. Thus, in the case of supposed white paints or pigments, the departure of the supposed white paint or pigments from true white is very greatly accentuated, whereby its true character can be established beyond doubt. The manner in which a characteristic tint is accentuated in accordance with the principles of the present invention, may be illustrated by considering the case of light reflected from a surface of polished copper. This metal owes its ruddy hue to its ability to reflect red light more strongly than any other color. Let us assume, for the sake of illustration, that a polished surface of copper reflects 100% of the red constituent in daylight and 50% of the blue constituent. If the light reflected from a first copper surface or mirror be in turn reflected from a second and still a third copper surface or mirror, we shall have a state of affairs shown in the following table:

It is thus evident that after the third re-

|  | Red. | Blue. |
|---|---|---|
| Intensity of daylight | 100 | 100 |
| Reflecting power of copper | 1 | 0.5 |
| Intensity after reflection from first mirror | 100 | 50 |
| Intensity after reflection from second mirror | 100 | 25 |
| Intensity after reflection from third mirror | 100 | 12.5 | flection the red light is relatively very much more intense than is the blue. In consequence of this phenomenon the copper appears of a deep ruby red color. Thus, by a method of multiple reflections the tint or color has been accentuated.

The principle of multiple reflections lends itself admirably to the determination of small departures from true white of various so-called white paints and pigments. In accordance with the present invention, the principle of multiple reflections is employed in order to accentuate this departure from white. If white light is allowed to fall on a surface that is slightly greenish, it is obvious that the diffusely reflected light will contain an excess of green. If, now, this light is allowed to fall on a second surface, identical with the first, the light reflected will be, relatively, still richer in green. Allowing similarly a third and fourth reflection to take place, it is possible to accentuate the green tint very pronouncedly. If a surface be truly white, that is non-selective, multiple reflections will affect only the intensity of the light and not its spectral distribution. As will be fully explained hereinafter, the method of the invention provides an extremely sensitive test for selectivity. Anticipating the results to be hereinafter presented, it may be stated here that of the many surfaces studied, (papers, salt, sugar, zinc oxid, white lead, precipitated salts, etc.) by the method and apparatus of the invention, not a single one has been found that does not depart noticeably from white.

The novel features of the invention which I believe to be patentable are definitely pointed out in the appended claims. These features, together with the construction and mode of operation of an apparatus embodying the same, will be understood from the following description taken in conjunction with the accompanying drawings, in which:

Figure 1 is an elevation, partly in section, of an apparatus embodying the invention;

Fig. 2 is a sectional detail of this apparatus; and

Figs. 3, 4, 5, 6 and 7 are explanatory diagrams.

The principle of multiple reflections, involved in the improved method and apparatus of the invention, may be realized in a number of different arrangements. Thus, in Fig. 4 of the drawings, there is diagrammatically represented a cylindrical tube 10 having its inside surface coated with the material to be tested. An incident ray of light $a$ is directed upon the coated inside surface of this tube and after three reflections the multiply reflected light $b$ is obtained. In Fig. 3 there is diagrammatically represented an annular disk 11 appropriately spaced from a somewhat larger circular disk 12. Incident rays of light $a$, directed upon the outer surface of the disk 12, emerge, after three reflections, through the central opening of the annular disk 11 as a reflected ray $b$. It will, of course, be understood that the disks 11 and 12 have their adjacent or facing surfaces coated with the material to be tested. In Fig. 5 a disk 13, having both of its faces coated with the material to be tested, is positioned within a hollow sphere 14 having its inner surface coated with the material to be tested. With this arrangement, an incident ray of light $a$, entering the sphere through an opening at the top, is reflected four times before emerging as a reflected ray $b$ through an appropriate opening at the bottom of the sphere. The condition sought in all cases is that no light leaving the surface after the first reflection shall illuminate directly that portion from which the light finally emerges. Thus, for example, it will be observed that the arrangement shown in Fig. 6 is faulty, because the incident ray of light striking the inside coated surface of a concave member 15 undergoes three reflections through the instrumentality of the disk 16 and only two reflections through the member 15 when emerging as the reflected ray $b$. Thus, the reflected ray is composed of rays which have undergone both two and three reflections and unreliable results may thereby be secured. By reversing the member 15 so that it occupies the position represented by 15' in Fig. 7 of the drawings, a satisfactory arrangement for three reflections is secured. The reflecting surfaces in these cases are not polished and the reflection from them is therefore diffused. The arrows are used to indicate merely directions taken by some of the diffusely reflected light.

While it is true that the accentuation of a tint increases exponentially with the number of reflections, a limit is set because of the resultant decrease in intensity. Furthermore, in practice, preference must be given that design which lends itself most readily to application of the surface to be studied. Taking all of these various elements under consideration, the design, diagrammatically represented in Fig. 3, has been chosen by me, as the preferred arrangement in the apparatus herein particularly described and illustrated. For the purposes of simplicity, I have termed this apparatus a "colorimeter."

The degree of accentuation may be calculated with readiness by studying the change in brightness (co-efficient of diffuse reflection) resultant upon the successive introduction of two different surfaces into the colorimeter. Let $I_0$ = intensity of incident light.
$I_1$ = intensity of light after $n$ reflections from material 1.
$I_2$ = intensity of light after $n$ reflections from material 2.
$R_1$ = coefficient of diffuse reflection of material 1 (known).
$R_2$ = coefficient of diffuse reflection of material 2 (known).
$n$ = number of reflections.
$K$ = instrumental constant.

Then:

$$\frac{I_1}{I_2} = \frac{I_0 K R_1^n}{I_0 K R_2^n}$$

or $$\frac{I_1}{I_2} = \left(\frac{R_1}{R_2}\right)^n$$

Whence $$n = \frac{\log \frac{I_1}{I_2}}{\log \frac{R_1}{R_2}}$$

For a substance of unknown brightness $R_3$:

$$R_3 = R_1 \sqrt[n]{\frac{I_3}{I_1}}$$

Now $R_1$ and $R_2$ may be determined by means of a Nutting (absolute) reflectometer or by means of the usual methods of photometry, in which case use is made of a surface smoked with magnesium oxid, whose reflecting power has been determined (87%) and which serves as a standard of brightness. The intensities $I_1$ and $I_2$ are determined with the new colorimeter. The value of $n$ is determined by the relative sizes of the colorimeter plates and of their separation. For separations of the order of the diameter of the upper disk $n=3$ or slightly greater; as the separation decreases, $n$ becomes larger. For the actual tests here recorded, the separation was such as to yield the value $n=3.6$ while in a series of tests later on with a smaller separation $n=4.2$.

If we were dealing with specular reflection, $n$ would necessarily have to be a whole number. However, we are dealing with diffuse reflection and, while $n$ must equal at least 3, it may be considerably larger due to the numerous reflections which take place. Since the human eye cannot detect differences in intensity less than 1 to 2% (Fechner's law) it is clear that the method of multiple reflections makes possible a discrimination between two surfaces whose brightness difference is, roughly, one-fourth of the above.

Considerations of a similar nature apply to the determination of the departure from white or "saturation," i. e., if green light be in excess by 1% after a first reflection, the excess will be approximately 4% after multiple reflections have taken place. Considering the truly marvelous sensibility of the eye in distinguishing color differences between two contiguous surfaces of large area, it would be rash to state that the new colorimeter is able to determine color differences between two surfaces which, under normal conditions, appear to be of the same brightness and tint. This much may be said, however: If the colorimetric analysis of the two surfaces is the same, the unaided eye may be able to distinguish a difference without being able to define the character of that difference.

Referring now to Fig. 1 of the accompanying drawings, I will describe the construction and mode of operation of an apparatus embodying the principles hereinbefore explained. The apparatus is mounted on a tripod base 20 adapted to be appropriately leveled by screws 21. A U-shaped support or bracket 22 rests on the top of the base 20. An L-shaped arm 23 is adjustably secured to one of the arms of the bracket 22 by means of winged nuts 24. A cylindrical shield 25 is adjustably secured to the L-shaped arm 23 by means of a rod 26 and nut 27. Within the shield 25 is mounted a source of light 28. I have used a 100 watt Mazda lamp with satisfactory results as the source of light 28.

The light, diffusely reflected from the lamp 28, illuminates the surface of a circular disk 12', which in turn illuminates the central portion of an annular disk 11'. The disks 11' and 12' are arranged in substantially the same manner as the disks 11 and 12 of Fig. 3, and, as in the case of Fig. 3, the adjacent or facing surfaces of these disks are coated with the material to be tested.

A photometer cube 29 is positioned above the central opening in the annular disk 11' and is appropriately inclosed within a housing 30. Cylindrical tubes 31 and 32 enter the housing 30 from opposite directions. An enlarged cylindrical chamber 33 is attached to the outer end of the tube 31. A disk of clear optical glass 34, roughly ground on both sides, is pivotally mounted within the chamber 33. This glass disk 34 may be turned about its pivot by means of an operating handle 35. A pointer 36 is secured to the disk 34 and moves therewith, and the position of this pointer, with respect to a scale 37, indicates the inclination of the disk 34.

The tube 32 has an appropriate lens 38 mounted therein and at its outer end is provided with a viewing or eye piece 39. Intermediate the lens 38 and eye piece 39 the tube 32 is slotted, so as to receive a piece of glass 40, as will be more clearly understood by reference to Fig. 2 of the drawings.

The disk 12' is mounted on a circular table 41 attached to the upper end of a rod 42. The height of the table 41 is adjustable and the table is secured at any desired height by means of the screw 43.

The shield 25 has a lateral opening 44 through which light from the lamp 28 passes to the surface of the disk 34, through an opening 45 in the top of the chamber 33. The interior of the shield 25, as well as the interior of the other inclosed chambers and tubes of the apparatus, is covered with black velvet or equivalent material for absorbing light and preventing objectionable reflections.

The light from the lamp 28, after three reflections between adjacent faces of the disks 11' and 12', passes upward through the central opening in the annular disk 11' and is reflected horizontally (toward the right, as viewed in Fig. 1 of the drawings) by means of the photometer cube 29. This reflected ray of light is diagrammatically represented in Fig. 1 of the drawings by the dotted line $c$. Another beam of light from the lamp 28 passes through the ports or openings 44 and 45 and is reflected from the disk 34 and passes through the tubes 31 and 32, as diagrammatically represented by the dotted line $d$. It is to be observed that the photometer cube 29 is arranged to reflect all rays of light striking the surface 29' and to transmit all other rays of light. Thus, that portion of the reflected rays $b$ (of the incident rays $a$) which strike the reflecting element 29' of the photometer cube, will be reflected through the tube 32. By this arrangement the lower half of the field of view through the tube 32 contains the multiply reflected light rays $b$ and $c$, while the upper half of the field of view of the tube 32 contains the rays $d$, which are non-selectively reflected from the ground surface of the optical glass disk 34.

The intensity of the light rays $d$, reflected from the disk 34, may be varied by rotating the disk 34 about its pivotal axis. Numerical values of intensities are obtained as a result of separate calibration involving the removal of the disk 12' and the admission of a beam of light coming from a separate lamp (mounted on a photometer bench) and illuminating a surface of magnesium oxid. This light, reflected diffusely, is again reflected by a prism. In order not to unduly complicate the drawing, this calibrating device is not illustrated. The intensity of the light reflected from the disk 34 may be varied in the ratio of 1:15. Whenever it becomes necessary to extend this range in either direction, a wire gauze coated with soot may be introduced either at R or Q. Since the percentage transmission of the gauze may be regulated by choosing the appropriate ratio of width of mesh to diameter of wire, it is possible to take care of all possible cases.

The photometer cube is viewed through a simple eye piece yielding a linear magnification of 2.5. Openings are provided in the eye piece tube for the insertion of a piece of "daylight" glass which transforms the yellowish light from the tungsten lamp into "white" light.

In order to produce a color match, a beam of monochromatic light, emanating from the secondary slit $S_2$ of a monochromatic illuminator, is projected on the disk 34 and passes through it, whereby monochromatic light is superimposed on the white light from the lamp 28. The intensity of the former is varied by means of a rheostat in series with the lamp illuminating the slit of the monochromatic illuminator. Color matching is not a simple operation, since three variables (1) intensity of white light, (2) intensity of colored light, and (3) wave length of colored light, have to be controlled. Proficiency is reached only after long experience.

Following the usual methods of monochromatic colorimetry, the color characteristics of any surface (single reflection) are defined in terms of:

1. Brightness (B), coefficient of diffuse reflections.
2. Saturation (S), ratio of intensity of monochromatic light to total light required to produce a color match.
3. Dominant hue ($\lambda$), wave-length of monochromatic light.

Since the necessary mode of procedure for obtaining the brightness (B) has already been discussed, it is only necessary to take up the matter of saturation (S).

Let $I_0$ = intensity of white light required to balance light from surface under investigation (simple reflection).

$I_1$ = intensity of white light necessary for color match.

$I_\lambda$ = Intensity of colored light necessary for color match.

Then $$I_0 = I_1 + I_\lambda$$

whence $$I_\lambda = I_0 - I_1$$

Then $$S = \frac{I_\lambda}{I_1 + I_\lambda} = \frac{I_0 - I_1}{I_0}$$

According to this procedure, $I_\lambda$ need not be measured, hence the introduction of a flicker-photometer becomes unnecessary.

The value of $\lambda$ is obtained from the calibration curve of the monochromatic illuminator. If, instead of a single reflection, $n$ reflections are realized, then the saturation is accentuated and it is necessary to extract the $n$th root of the apparent saturation so as to reduce the measurement to the conditions under which the surface is normally viewed, i. e., the first reflection.

Whenever the departure from white is marked, i. e., when the true saturation is 5% or more, readings are easily reproducible. Intensity measurements rarely differ by more than 1% and the dominant hue can be fixed to within 1 to $1.5\mu\mu$. However, when saturation values are small (less than 0.7%) measurements become increasingly difficult particularly in fixation of the wave length of the dominant hue.

The following table contains data on the color characteristics of a number of nearly-white substances:

| Substance. | Brightness. | Saturation. | Dominant hue $\lambda$ in $\mu\mu$. | Remarks. |
|---|---|---|---|---|
| | Per cent. | Per cent. | | |
| Magnesium oxid. | 85 | 0.2 | 486 | Blue—fumes from burning magnesium. |
| Magnesium carbonate. | 87 | 0.75 | 578 | Yellow—scrapings from commercial black—flattened with glass. |
| Paper | 67 | 0.70 | 489 | Blue—single sheet linen paper (thin). |
| Paper | 74 | 3.0 | 581 | Yellow—single sheet linen paper (heavy). |
| White lead | 69 | 3.8 | 580 | Yellow—rubbed down with pale linseed oil—paste form. |
| Zinc oxid (pure). | 76 | 1.0 | 562 | Green—rubbed down with pale linseed oil—paste form. |
| Zinc oxid (leaded). | 67 | 7.1 | 583 | Yellow—rubbed down with pale linseed oil—paste form. |

All of these substances depart markedly from white. Even magnesium carbonate, which has been used frequently as a non-selective reflector in colorimetric investigations, is definitely yellowish.

Following the well known practice, the procedure may be simplified by eliminating measurements of saturation and dominant hue and instead, determining the brightness for blue, green and red light. Color screens of dominant hue; $440\mu\mu$ (blue), $550\mu\mu$ (green) and $625\mu\mu$ (red) may, for example, be placed in succession before the eye piece and the brightness for these three colors determined. While this procedure lacks the scientific rigor of the former, it possesses marked advantages. First of all, no standard "white" light is required, second, no color matching is necessary, and third, it serves admirably in establishing limits of tolerance, that is, selectively, for substances which are already nearly white.

The advantages derived from multiple reflections need not be sacrificed when markedly colored surfaces are to be studied. The only difficulty in such circumstances is to get enough light for accurate measurement.

The theoretical and scientific principles of operation of the apparatus of the invention will be clear to those skilled in the art from the foregoing discussion. In general, it will be observed that the apparatus comprises appropriate instrumentalities for so directing a beam of light, from a suitable source, upon reflecting means, including one or more surfaces of the color or tint to be tested, that the beam of light undergoes a plurality of reflections from the tinted surface or surfaces. The resulting multiply-reflected beam of light is then directed into an appropriate field of view, where the accentuation of the tint may be observed and compared with an appropriate standard.

In the apparatus herein described, and illustrated, the multiply-reflected beam of light is juxtaposed in the field of view with a standard beam of light derived from the common light source (28). This standard beam of light is non-selectively reflected from the coarse-ground surface of the disk or plate 34 of optical glass, and the intensity of this standard beam of light can be varied by adjusting the inclination of the disk 34. In the field of view, as observed through the eye piece 39, the two juxtaposed beams of light appear as semi-circular segments, the line of demarcation between these segments being susceptible of variation by adjusting the inclination of the disk 34. In the use of the apparatus, the disk 34 is adjusted until the two juxtaposed beams of light are as nearly matched as possible, and then, from the position of the pointer 36 or the scale 37, the tint of the multiply-reflected beam of light can be ascertained or calculated as hereinbefore explained.

I claim:—

1. A method of accentuating tints which comprises subjecting a beam of light from an appropriate source to a plurality of reflections from surfaces of the tint to be accentuated, and segregating the multiply-reflected beam of light and comparing the same with an appropriate standard; substantially as described.

2. A method for accentuating tints which comprises juxtapositioning two beams of light derived from a common source, one of said beams having first undergone a plurality of reflections from surfaces of the tint to be accentuated, and the other of said beams being non-selectively derived from said source; substantially as described.

3. A method for the purposes herein set forth which comprises juxtapositioning two beams of light derived from a common source, one of said beams having first undergone a plurality of reflections from surfaces of the color to be tested and the other of said beams having undergone non-selective reflection, and adjusting the intensity of the non-selectively reflected beam until the two juxtaposed beams are appropriately matched; substantially as described.

4. A method for the purposes herein set forth which comprises directing a beam of light from an appropriate source upon a surface of the color to be tested, subjecting said beam of light to a plurality of reflections from surfaces of the color to be tested, passing said multiply-reflected beam of light through the reflecting region of a photometer cube, passing a beam of light derived from said source without selective reflection through the transparent region of said photometer cube, and juxtapositioning the two beams of light from the photometer cube for the purposes of comparison; substantially as described.

5. A method for the purposes herein set forth which comprises directing a beam of light from an appropriate source upon a device having surfaces of the color to be tested, subjecting said beam of light to a plurality of reflections from said surfaces, passing said multiply-reflected beam of light through the reflecting region of a photometer cube, passing a reflected beam of light derived from said source without selective reflection through the transparent region of said photometer cube, juxtapositioning the two beams of light from the photometer cube for the purposes of comparison, and adjusting the intensity of said non-selective beam of light until the juxtaposed beams are appropriately matched; substantially as described.

6. An apparatus for accentuating tints comprising a source of light, reflecting means including surfaces of the tint to be tested, means for directing a beam of light from said source upon said reflecting means so that the beam undergoes a plurality of reflections from said surfaces, and means for segregating the thus multiply-reflected beam of light for comparison with an appropriate standard.

7. An apparatus for accentuating tints comprising a source of light, reflecting means including surfaces of the tint to be tested, means whereby a beam of light from said source directed upon said reflecting means undergoes a plurality of reflections from said surfaces, and means for directing the multiply-reflected beam of light into an appropriate field of view.

8. An apparatus for accentuating tints comprising a source of light, reflecting means including a pair of spaced members having their facing surfaces of the tint to be tested, means whereby a beam of light from said source directed upon said reflecting means undergoes a plurality of reflections from said tinted surfaces, and means for directing the multiply-reflected beam of light into an appropriate field of view.

9. An apparatus for accentuating tints comprising a source of light, reflecting means including surfaces of the tint to be tested, means whereby a beam of light from said source directed upon said reflecting means undergoes a plurality of reflections from said surfaces, means for directing the multiply-reflected beam of light into an appropriate field of view, and means for directing into said field of view in juxtaposition with said multiply-reflected beam a second beam of light derived from said source without selective reflection.

10. An apparatus for accentuating tints comprising a source of light, reflecting means including surfaces of the tint to be tested, means whereby a beam of light from said source directed upon said reflecting means undergoes a plurality of reflections from said surfaces, means for directing the multiply-reflected beam of light into an appropriate field of view, means for directing into said field of view in juxtaposition with said multiply-reflected beam a second beam of light derived from said source without selective reflection, and means for adjusting the intensity of said non-selective beam of light.

11. An apparatus for accentuating tints comprising a source of light, reflecting means including surfaces of the tint to be tested, means whereby a beam of light from said source directed upon said reflecting means undergoes a plurality of reflections from said surfaces, and means including a photometer cube for directing the multiply-reflected beam of light into an appropriate field of view.

12. An apparatus for accentuating tints comprising a source of light, reflecting means including a pair of spaced members having their facing surfaces of the tint to be tested, means for adjusting the spaced relation between said members, means whereby a beam of light from said source directed upon said reflecting means undergoes a plurality of reflections from said surfaces, and means including a photometer cube for directing the multiply-reflected beam of light into an appropriate field of view.

13. An apparatus for accentuating tints comprising a source of light, reflecting means including surfaces of the tint to be tested, means whereby a beam of light from said source directed upon said reflecting means undergoes a plurality of reflections from said surfaces, means including a photometer cube for directing the multiply-reflected beam of light into an appropriate field of view, and means including said photometer cube for directing into said field of view in juxtaposition with said multiply-reflected beam of light a beam of light derived from said source without selective reflection.

In testimony whereof I affix my signature.

AUGUST HERMAN PFUND.